United States Patent
Jaloma et al.

(10) Patent No.: US 10,235,202 B2
(45) Date of Patent: Mar. 19, 2019

(54) THREAD INTERRUPT OFFLOAD RE-PRIORITIZATION

(71) Applicant: International Business Machines Corporation, Armonk, NY (US)

(72) Inventors: Jaime A. Jaloma, Austin, TX (US); Mark D. Rogers, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/346,139

(22) Filed: Nov. 8, 2016

(65) Prior Publication Data

US 2018/0129532 A1 May 10, 2018

(51) Int. Cl.
  *G06F 9/455* (2018.01)
  *G06F 9/48* (2006.01)
  *G06F 9/50* (2006.01)

(52) U.S. Cl.
  CPC ........ *G06F 9/4818* (2013.01); *G06F 9/45558* (2013.01); *G06F 9/5016* (2013.01); *G06F 9/5038* (2013.01); *G06F 2009/45579* (2013.01); *G06F 2009/45583* (2013.01)

(58) Field of Classification Search
  None
  See application file for complete search history.

(56) References Cited

U.S. PATENT DOCUMENTS

| | | | |
|---|---|---|---|
| 6,728,792 B2 | 4/2004 | Wagner | |
| 6,732,138 B1 * | 5/2004 | Browning | G06F 9/468 718/102 |
| 7,373,438 B1 * | 5/2008 | DeBergalis | G06F 3/0611 707/999.001 |
| 7,493,436 B2 | 2/2009 | Blackmore et al. | |
| 7,783,787 B1 | 8/2010 | Debergalis et al. | |
| 8,347,296 B2 | 1/2013 | Yasutake | |
| 8,560,750 B2 | 10/2013 | Sarkar | |

(Continued)

OTHER PUBLICATIONS

Jaime A. Jaloma et al.; "Memory Stripe With Selectable Size", U.S. Appl. No. 15/346,178, filed Nov. 8, 2016.

(Continued)

*Primary Examiner* — Gregory A Kessler
(74) *Attorney, Agent, or Firm* — Cantor Colburn LLP; Joseph Petrokaitis

(57) ABSTRACT

A computing system is provided and includes first and second computing resources defined, during system initialization, as first kernel threads and a second kernel thread with which the first kernel threads are operably associated, a memory manager and a re-prioritization controller. The memory manager is configured to handle a portion of pending input/output (I/O) operations at an interrupt level and to offload a remainder of the pending I/O operations to the first kernel threads according to an offload condition whereby the offloaded I/O operations are queued according to a first scheme. The re-prioritization controller is configured to transfer a portion of the offloaded I/O operations from the first kernel threads to the second kernel thread according to a transfer condition whereby the transferred I/O operations are re-prioritized according to a second scheme.

8 Claims, 8 Drawing Sheets

(56) References Cited

U.S. PATENT DOCUMENTS

| | | | |
|---|---|---|---|
| 9,032,127 B2 | 5/2015 | Fischer et al. | |
| 9,141,573 B2 | 9/2015 | Saripalli | |
| 9,158,575 B2 | 10/2015 | Smith | |
| 2014/0208331 A1* | 7/2014 | Li | G06F 9/5044 |
| | | | 718/105 |

OTHER PUBLICATIONS

List of IBM Patents or Patent Applicaqtions Treated as Related; (Appendix P), filed Nov. 8, 2016; 2 pages.
Anjum et al., "Bulk Scheduling With the Diana Schedule", IEEE, 2006, vol. 53, pp. 3818-3829.

\* cited by examiner

THREAD INTERRUPT OFFLOAD RE-PRIORITIZATION

BACKGROUND

The present invention relates to a virtual memory manager (VMM) and, more specifically, to a VMM thread interrupt offload (VTIOL) re-prioritization (VTIOLR) and infrastructure for support executions of VTIOLR processing.

In computing systems before the advent of VTIOL processing, the VMM would handle all of the received input/output (I/O) operations, such as pending read and write process requests coming in from various processes running on physical computing resources for each instance of an operating system, at the interrupt level. The VMM was thus generally configured, at least in part, as an I/O completion interrupt handler. This meant however that anytime an I/O operation would come in, the incoming I/O operation would block other I/O operations until the incoming I/O operation was finished executing. This situation, in turn, led to the provision of a cycle of blocking and unblocking by the I/O completion handler of the VMM and would continue until every incoming I/O operation was finished. Often, overall system performance was negatively affected especially in the case of delays in the ability of the VMM to handle high priority work.

VTIOL processing improved system performance by allowing the VMM to offload processing of the incoming I/O operations in cases where it made sense to do so. Therefore, a VMM with VTIOL capability would have been configured to employ several heuristics in determining whether to offload a given incoming I/O operation or not. For example, if a process is running on a given computing system that reads some data from memory and that data is immediately used it typically doesn't make sense to offload the read since the process will be blocked waiting for the data to be read anyway and offloading the request comes with some inherent overhead associated with the time taken to send requests to VTIOL processing as compared to processing those requests via the interrupt handler. On the other hand, if a process reads some data from memory but doesn't immediately use it, it can make sense for the VMM to offload that read so as to continue executing other instructions. Then, by the time the VMM gets to the instruction where that read is needed, the VTIOL will have already handled that I/O operation.

SUMMARY

According to an embodiment of the present invention, a computing system is provided and includes first and second computing resources defined, during system initialization, as first kernel threads and a second kernel thread with which the first kernel threads are operably associated, a memory manager and a re-prioritization controller. The memory manager is configured to handle a portion of pending input/output (I/O) operations at an interrupt level and to offload a remainder of the pending I/O operations to the first kernel threads according to an offload condition whereby the offloaded I/O operations are queued according to a first scheme. The re-prioritization controller is configured to transfer a portion of the offloaded I/O operations from the first kernel threads to the second kernel thread according to a transfer condition whereby the transferred I/O operations are re-prioritized according to a second scheme.

According to another embodiment of the present invention, a virtual memory manager (VMM) input/output (I/O) completion processing mechanism is provided for deployment in a computing system. The computing system includes a plurality of VMM thread interrupt offload (VTIOL) threads and a plurality of VTIOL queues operably associated with each VTIOL thread. Each of the VTIOL queues includes a queue of process requests that are offloaded from the VMM and queued according to a first scheme. The mechanism includes a VTIOL re-prioritization (VTIOLR) thread disposed in parallel with the VTIOL threads by which at least a portion of the process requests are re-prioritized according to a second scheme and completed.

According to yet another embodiment of the present invention, a virtual memory manager (VMM) input/output (I/O) completion processing method is provided. The method includes identifying a portion of I/O operations that have been offloaded to first kernel threads from a completion handler for re-prioritization. The method further includes re-prioritizing and completing the portion of the I/O operations in a second kernel thread operably associated with the first kernel threads.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a computer system is provided with virtual memory manager (VMM) thread offload (VTIOL) re-prioritization (VTIOLR) capability. The VTIOLR capability addresses the issue with conventional VTIOL processing capability where so many input/output (I/O) operations are offloaded to the VTIOL infrastructure that the VTIOL infrastructure is slowed down and eventually falls behind in processing the offloaded I/O operations.

Figure 1:
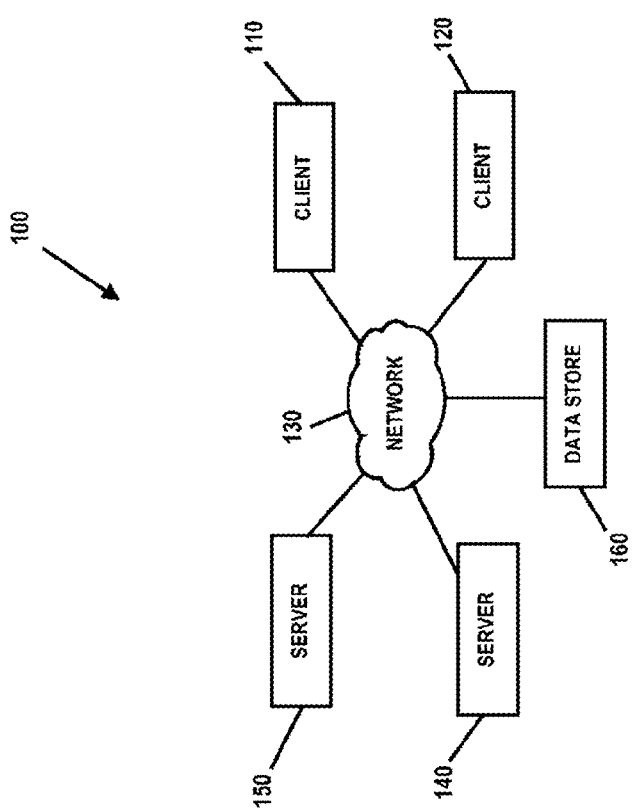
FIG. 1 is a diagram of a network of data processing systems in accordance with embodiments.
Figure 2:
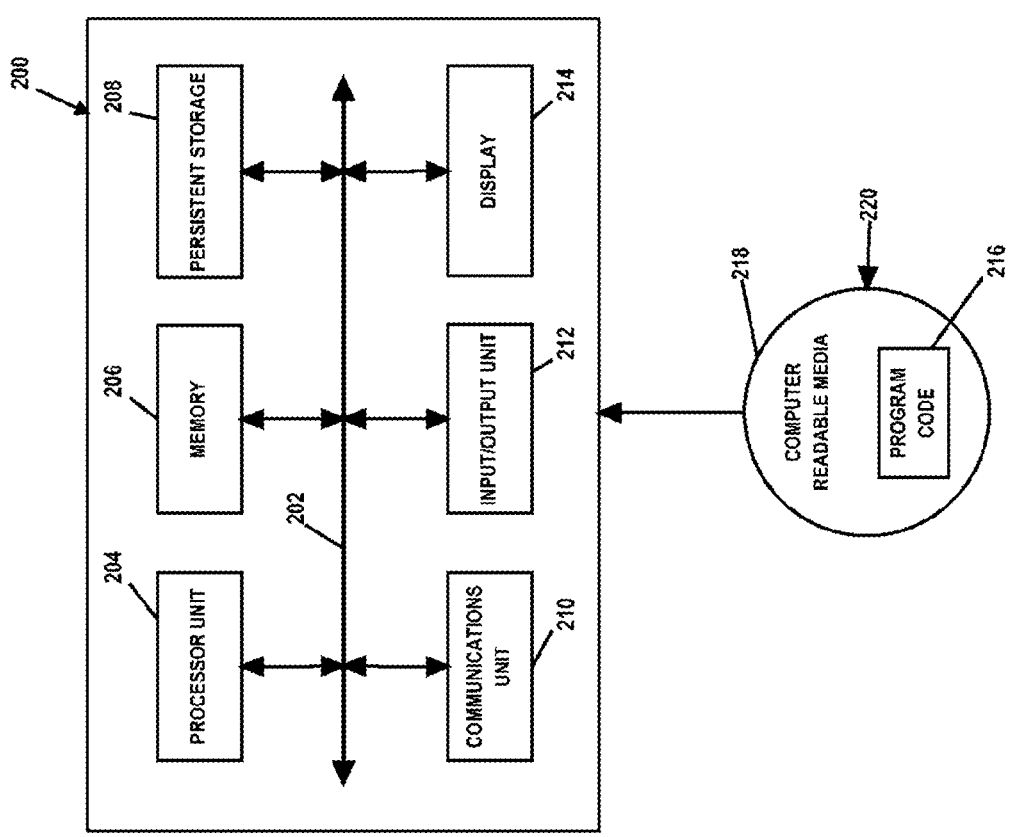
FIG. 2 is a diagram of a data processing system in accordance with embodiments.

With reference to FIGS. 1 and 2, diagrams of data processing environments are provided in which illustrative embodiments of the present disclosure may be implemented.

It should be appreciated that FIGS. 1 and 2 are only exemplary and are not intended to assert or imply any limitation with regard to the environments in which different embodiments may be implemented. Many modifications to the depicted environments may be made.

FIG. 1 represents a network of data processing systems in which illustrative embodiments of the present disclosure may be implemented. Network data processing system 100 is a network of computers and includes network 130, which is the medium used to provide communications links between various devices and computers connected together within network data processing system 100, server 140 and server 150 that connect to network 130 along with data store 160 and clients 110 and 120. Server 140 and server 150 may be, for example, IBM® Power Systems™ servers. Clients 110 and 120 may be, for example, personal computers or network computers. In the depicted example, server 140 provides data and/or services such as, but not limited to, data files, operating system images and applications to clients 110 and 120. Network data processing system 100 may include additional servers, clients, and other devices.

With reference to FIG. 2, a data processing system 200 is provided whereby virtual machine operating systems are operable on server 140, server 150, client 110 or client 120. The data processing system 200 includes a bus or communications fabric 202, which provides communications between processor unit 204, memory 206, persistent storage 208, communications unit 210, input/output (I/O) unit 212 and display 214.

Processor unit 204 executes instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

I/O unit 212 enables input and output of data with other devices that may be connected to data processing system 200. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code or computer readable program code that may be read and executed by a processor in processor unit 204. The program code in the different embodiments may be embodied on different physical or tangible computer readable media such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive or a flash memory that is connected to data processing system 200. The tangible form of computer readable media 218 is also referred to as computer recordable storage media. In some instances, computer readable media 218 may not be removable. Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
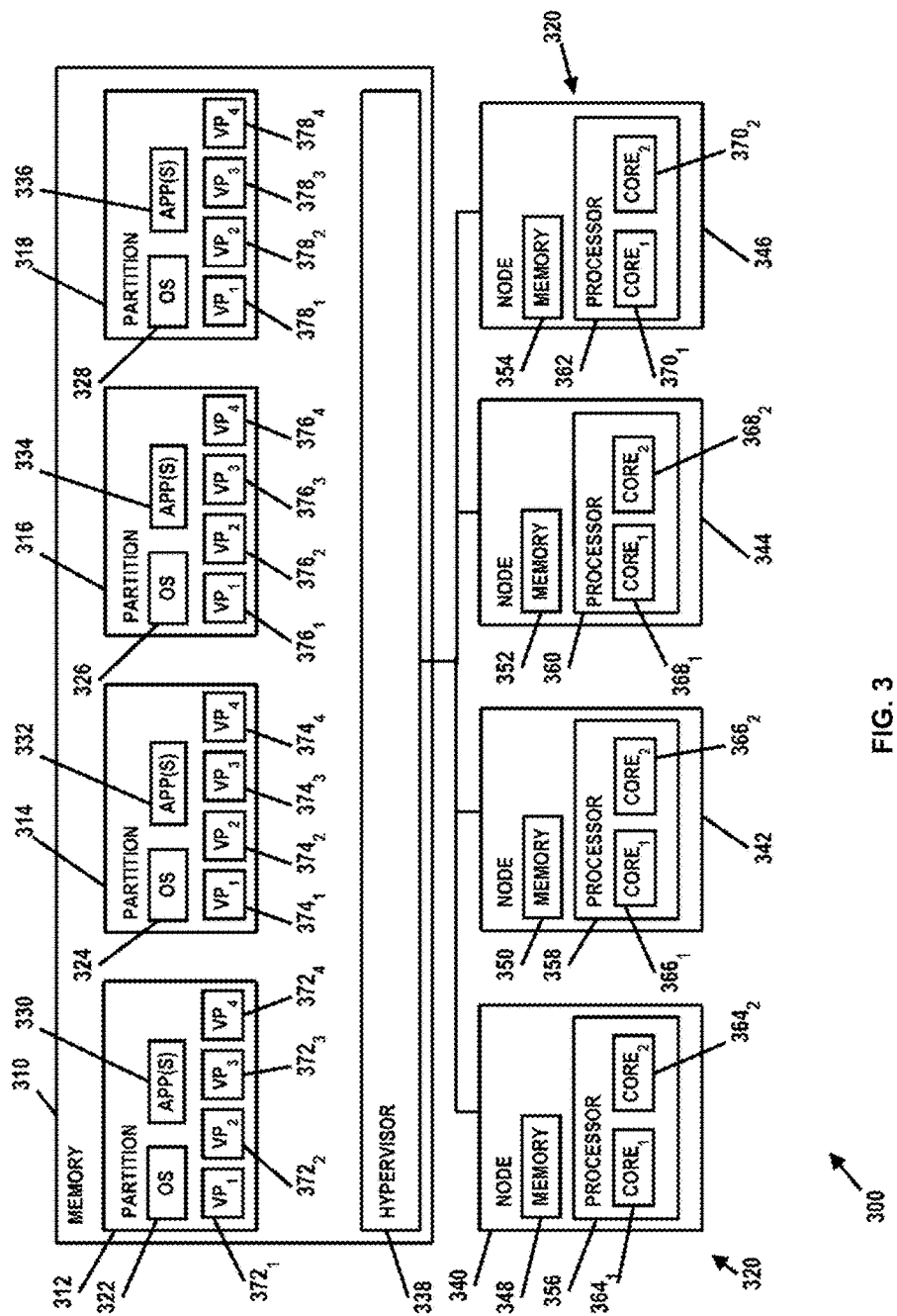
FIG. 3 is a diagram of a data processing system for operation of a virtual machine in accordance with embodiments.

FIG. 3 is an illustrative embodiment of a system 300 for supporting operations of virtual machine operating systems. System 300 may be implemented on data processing systems or platforms such as, but not limited to, servers 140 and/or 150, clients 110 and/or 120 or at other data processing system locations. In the embodiment illustrated in FIG. 3, system 300 is apportioned into logical partitions (LPARs) or virtual machines that may operate independently, each LPAR running its own operating system and applications. In the illustrated embodiment, system 300 includes a memory 310 having LPARs 312, 314, 316 and 318, however, it should be understood that a greater or fewer quantity of LPARs may be provisioned. LPARs are assigned a subset of a computer's physical hardware resources 320 (i.e., a subset of the hardware underlying the computer/server environment) and are virtualized within the computer/server environment as a separate computer/virtual machine. Resources such as processor capacity, memory, or any other type of resource may be assigned to a particular LPAR. Each LPAR has its own virtual operating system (OS) instance (e.g., operating systems 322, 324, 326 and 328 in respective LPARs 312, 314, 316 and 318), application programs (e.g., application(s) 330, 332, 334 and 336 in respective LPARs 312, 314, 316 and 318) and/or associated files, allowing for multiple operating systems to be simultaneously executing within the server computer/environment.

Logical partitioning is facilitated by logic or software 338 (a "hypervisor") that controls the computer system's hardware and monitors the operating systems of the LPARs. For example, hypervisor 338 may comprise software, logic and/or executable code for performing various functions as described herein (e.g., residing as software and/or an algorithm running on a processor unit). Hypervisor 338 operates at a level between the logical partition operating systems level and computer/server system physical hardware resources 320. Hypervisor 338 may run directly on the computer system's hardware or within a conventional operating system environment, depending upon the implementation.

In the illustrated embodiment, physical resources 320 include a number of integrated circuits (ICs), chips or processing nodes 340, 342, 344 and 346. The quantity and/or types of physical resources may vary. In the illustrated embodiment, each respective node 340, 342, 344 and 346 includes a memory 348, 350, 352 and 354 and a processor 356, 358, 360 and 362. Each processor 356, 358, 360 and 362 may include one or more processor cores. For example, processor 356 includes cores $364_1$-$364_2$, processor 358 includes cores $366_1$ and $366_2$, processor 360 includes cores $368_1$ and $368_2$, and processor 362 includes cores $370_1$ and $370_2$. It should be understood that the quantity of cores for any particular node may vary. Nodes 340, 342, 344 and 346 (or components thereof) may comprise a shared physical resource pool (e.g., as to processors 356, 358, 360 and 362, a shared processor pool). The shared pool of physical resources enables a system or apparatus to assign whole and/or partial resources to a logical partition. For example, physical processors 356, 358, 360 and 362 may be configured as a processing pool such that processors 356, 358, 360 and 362 (as well as their respective cores) are shared among numerous logical partitions (e.g., LPARs 312, 314, 316 and 318).

Logical partitions may be assigned virtual resources which may include logical entities backed up by corresponding physical entities. For example, logical partitions may be assigned virtual processors which are depictions of physical processors (e.g., processors 356, 358, 360 and 362) that are presented to the operating system of the respective partition. The types of physical resources that may be virtualized may vary. With respect to virtual processors, each virtual processor may represent a processing capacity (e.g., a processing unit) of a physical processor. The processing capacity represented by a virtual processor may be the entire processing capacity of a physical processor or a portion thereof. In the illustrated embodiment, each LPAR. 312, 314, 316 and 318 has assigned thereto a number of virtual processors. For example, LPAR 312 includes virtual processors (VP$_1$-VP$_4$) $372_1$-$372_4$. Similarly, LPAR. 314 includes virtual processors (VP$_1$-VP$_4$) $374_1$-$374_4$ LPAR 316 includes virtual processors (VP$_1$-VP$_4$) $376_1$-$376_4$, and LPAR 318 includes virtual processors (VP$_1$-VP$_4$) $378_1$-$378_4$ The number of virtual processors assigned to a particular partition and/or an overall computing platform may vary.

In some embodiments, LPARs can be configured to have a certain entitlement capacity or entitled resources representing a guaranteed physical resource capacity for the LPAR. For example, LPAR 312 includes four virtual processors and may have a core entitlement of two such that a two-core processing capacity is guaranteed for LPAR 312. Because the cores may be allocated from a shared processor pool, hypervisor 338 allocates core processing capacity from the shared processor pool as needed, which means the cores provided to LPAR 312 to meet its entitlement may also be used by other LPARs. In an uncapped mode of operation, if LPAR 312 requires additional processing capacity beyond its entitlement, hypervisor 338 may allocate additional cores from the shared processor pool (if available).

Generally, there are multiple storage levels a core may access. These include, but are not limited to, processor caches (L1, L2, L3, etc.), memory (RAM), and disk storage. Further, within each storage level there may be multiple levels of affinity (e.g., determined by the distance between a core and the memory it accesses). The first level of affinity may include a memory located on the same chip as the core, a next level of affinity may refer to memory located on a neighbor chip, etc.

Figure 4:
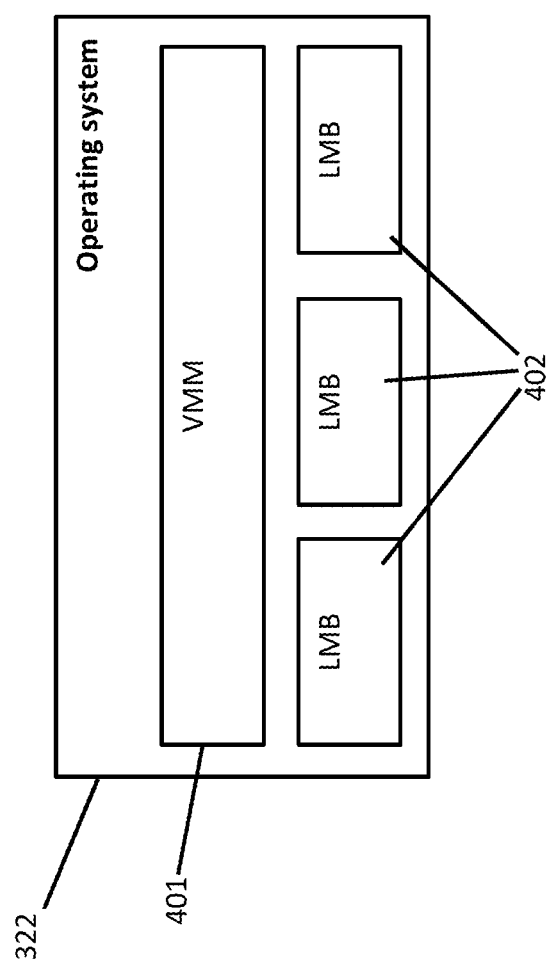
FIG. 4 is a diagram illustrating a data processing system for operation of a virtual machine in accordance with embodiments.

FIG. 4 is a diagram illustrating an embodiment of operating system and hypervisor interaction. In the embodiment illustrated in FIG. 4, a single operating system instance is shown (e.g., OS 322), however, it should be understood that other operating systems of system 300 may be similarly configured. In operation, operating system 322 uses data structures called memory pools to manage the free memory in each memory resource and includes a virtual memory manager (VMM) 401. The VMM 401 may include software, logic and/or executable code for performing various functions as described herein (e.g., residing as software and/or an algorithm running on a processor unit) and serves in part to maintain memory topology information in various domains. Of those domains, one type may include a collection of logical memory blocks (LMBs) 402.

Workloads in a given computing system may normally implement their data processing operations as software instructions that are executed on CPUs. These software instructions, and the data on which they operate, may be stored on data storage resources. As discussed above, there are times when software execution of workload functions entails processing that is computationally intensive, such that data processing throughput would benefit from offloading such work from the main CPU to another idle CPU.

Figure 5:
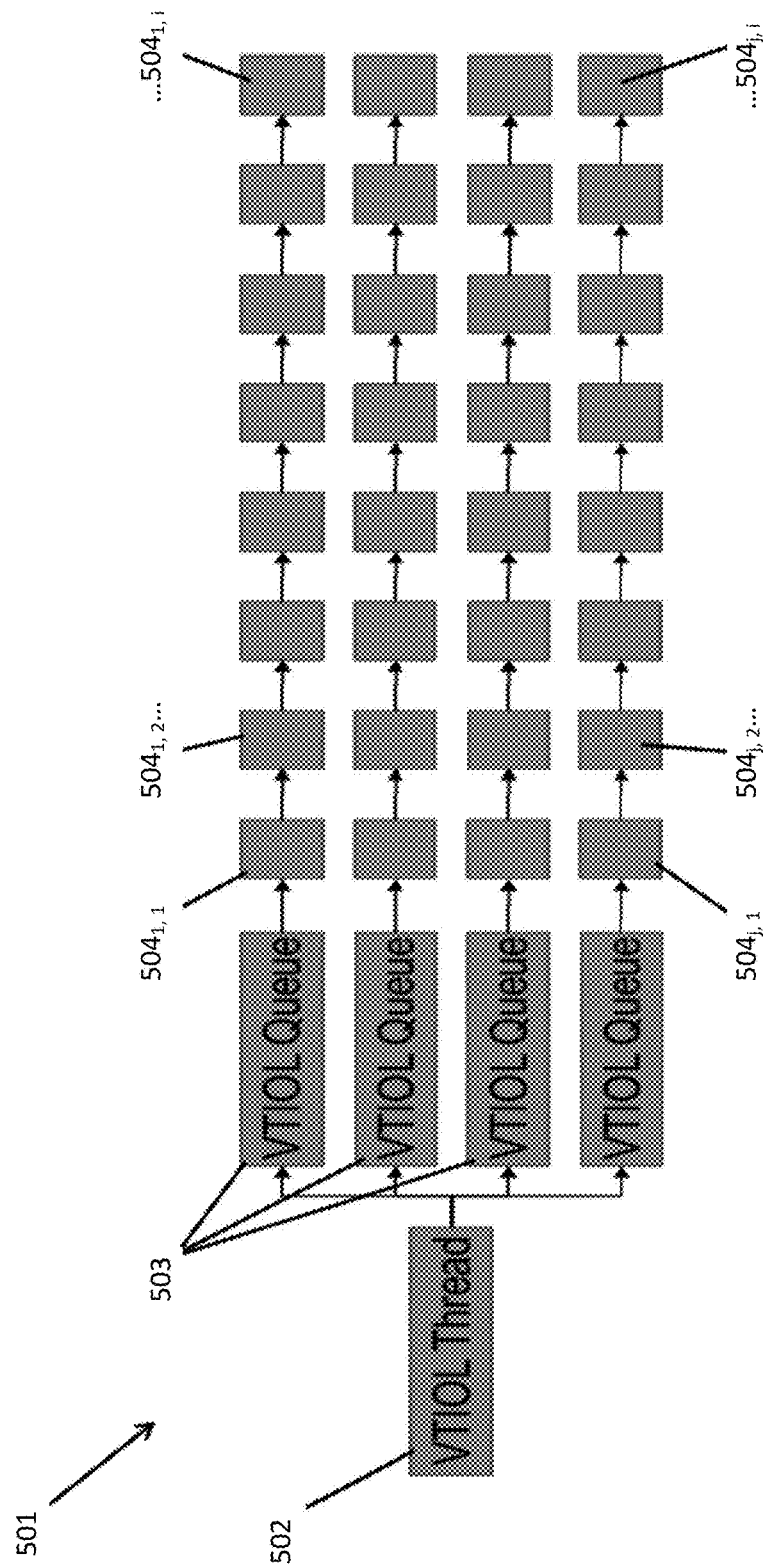
FIG. 5 is a schematic diagram of a virtual memory manager (VMM) thread interrupt offload (VTIOL) infrastructure in accordance with embodiments.

Thus, with reference to FIG. 5, a VTIOL infrastructure 501 is provided. The VTIOL infrastructure 501 is initiated during system initialization (e.g., of a computing system) whereby a portion of available computing resources are defined as one or more first or VTIOL threads 502. Although only one VTIOL thread 502 is shown in FIG. 5, it is to be understood that multiple VTIOL threads 502 may be defined. In any case, each VTIOL thread 502 includes a plurality of VTIOL queues 503 that are in turn formed of a plurality of buffer elements $504_{1 \to i, 1 \to i}$ that are arranged in sequence from or within each individual VTIOL queue 503. During system operation, this VTIOL infrastructure 501 is provided such that the VTIOL queues 503 hold offloaded I/O process requests, such as a certain read process requests or certain write process requests, for the VTIOL thread 502 to handle one at a time according to a first scheme (e.g., a first in, first out (FIFO) basis). The offloaded I/O process requests are offloaded to the VTIOL infrastructure 501 in accordance with an offload condition being met. This offload condition is based on a first set of predefined tunable inputs that are received by the computing system during the system initialization.

Figure 6:
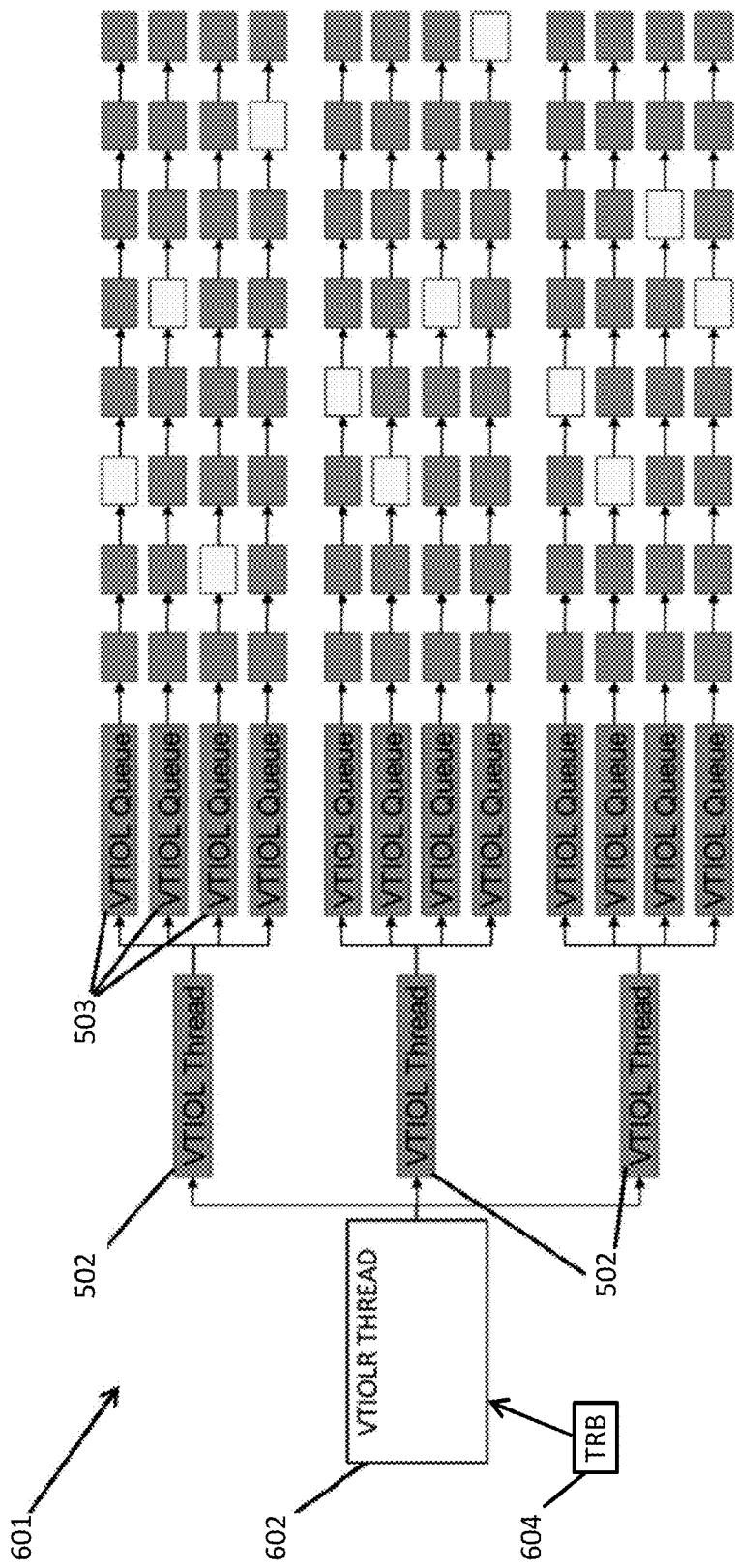
FIG. 6 is a schematic diagram of a VTIOL re-prioritization (VTIOLR) infrastructure in accordance with embodiments.

With continued reference to FIG. 5 and with additional reference to FIG. 6, a VTIOLR infrastructure 601 is provided on top of an underlying VTIOL infrastructure 601. The VTIOLR infrastructure 601 adds a parallel second or VTIOLR thread 602 that monitors the VTIOL threads 502 within its domain and transfer and re-prioritizes a portion of the offloaded process requests (e.g., buffer elements $504_{1,3}$, $504_{2,5}$, $504_{3,2}$, etc.) to the VTIOLR thread 602 if the VTIOLR thread 602 finds one or more that should be taken care of right away or at least out of the order established within the VTIOL infrastructure 501. The portion of the offloaded process requests that are identified or located as being candidates for transfer and re-prioritization is defined by the number of those offloaded process requests meeting a transfer condition that is based on a second set of pre-defined tunable inputs being received by the computing system.

With the above in mind, the VTIOLR infrastructure 601 introduces improvements to the VTIOL infrastructure 501. While VTIOL capability allows VMM I/O processing to be off-loaded to kernel threads (i.e., the VTIOL threads 502) in some cases rather than doing so under the I/O completion interrupt handler itself, a given VTIOL thread 502 can take a long time to process either a single large I/O buffer or many smaller buffers behind it in its queue. The VTIOLR infrastructure 601 implements a system and method by which the processing of off-loaded VMM I/O completions (i.e., the offloaded process requests) is re-prioritized based upon certain criteria. A general use case for illustrating the effectiveness of VTIOLR capability is when a small read( ) is performed from a file and the I/O completion processing for that read gets queued behind a large I/O completion from a filesystem sync( ) for example. The read( ) in this case, might be conceptually viewed as a foreground job whereas the sync( ) is viewed as a background job. The read therefore could be expected to have a higher priority and a shorter expected response time. VTIOLR capability provides for a re-prioritization thread that can re-prioritize a buffer element associated with the read( ) from one of the VTIOL threads 502 if the read( ) meets the criteria set by the user.

The details of the initialization and subsequent operation of the VTIOLR infrastructure 601 are set by tunable options that will control the various aspects of how the VTIOLR infrastructure 601 is built and how and when offloaded process requests are re-prioritized by the VTIOLR threads 602.

A first tunable is the vtiolr_mode tunable and controls whether VTIOLR is enabled or disabled and, if the VTIOLR is enabled, it also controls whether the VTIOLR threads 402 are forced to run in a default run queue or on a global run queue. All new threads are placed in the global run queue. When a CPU is ready to dispatch a thread, the global run queue is checked first. The default run queue scheduler will re-queue a thread to the same processor queue where it ran in the previous time quantum. This helps AIX maintain processor affinity. Forcing VTIOLR to run in the global run queue ensures that the thread will be re-queued to the global run queue instead of the queue of the current CPU once the time quantum expires. It will then be dispatched by the next available CPU. Changing this tunable requires a system reboot in order for the change to take effect.

A second tunable is the vtiolr_ratio, which defines a number of VTIOLR threads 602 as a function of the number of VTIOL threads 502. That is, this tunable controls a ratio of VTIOL threads 502 to one VTIOLR thread 602 and is used during the system initialization to generate a correct number of VTIOLR threads 602 that are needed for the VTIOL threads 502. The second tunable also defines a maximum number of VTIOL threads 502 that one VTIOLR thread 602 will handle but it is to be understood that the domain of one VTIOLR thread 602 can contain fewer VTIOL threads 502 than this tunable allows. Making a change to this tunable requires a system reboot in order for the change to take effect.

Some of the tunables are dynamic, such as the vtiolr_scan tunable. The vtiolr_scan tunable controls how often the VTIOL queues 503 will be scanned for buffers that can be re-prioritized. The value of this tunable may be provided in units of time whereby every time this time delta elapses on the computing system, the VTIOL queues 503 will be scanned for a buffer that can be re-prioritized based upon current re-prioritization criteria.

Another dynamic tunable is the vtiolr_thrsh tunable, which controls a threshold where an I/O request can be re-prioritized by the VTIOLR thread 602. Any requests that qualify to be re-prioritized and have been waiting on the VTIOL queues 503 longer than this threshold are considered eligible for re-prioritization by the VTIOLR thread 602. The value of this tunable may be given in units of time.

Other dynamic tunables are the vtiolr_pgin_mode tunable and the vtiol_pgout_mode, which respectively control the read re-prioritization modes and the write re-prioritization modes. These tunables control whether a read or write will be re-prioritized or not, and if they are, whether the VTIOLR will only re-prioritize if doing so will not result in added lock contention on the computing system.

Still other dynamic tunables are the vtiolr_rd_size tunable and the vtiolr_wr_size tunable, which respectively control the maximum size read or write that can be re-prioritized. All reads or writes that are less than or equal to these sizes, and meet the criteria set by the other tunables, are eligible. The values of these tunables may be given in units of bytes.

Figure 7:
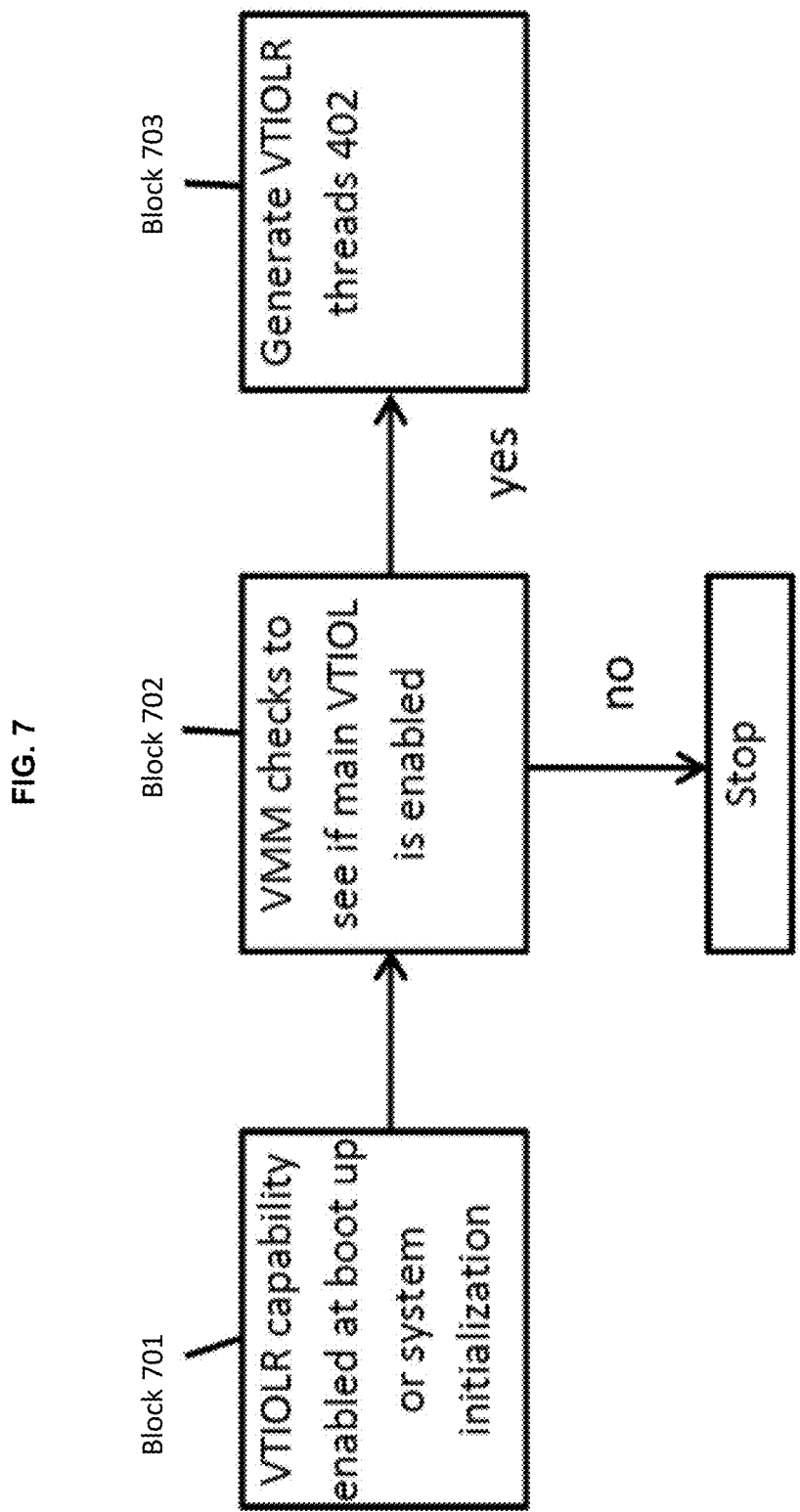
FIG. 7 is a flow diagram illustrating processes executed to initialize a VTIOLR infrastructure during system initialization in accordance with embodiments.

In operation, with reference to FIG. 7, VTIOLR capability will be enabled at boot time via the vtiolr_mode tunable (block 701). This will be a bosboot tunable that will require a bosboot and reboot to change. Once the feature is enabled, the VMM will first check to see if the main VTIOL feature is enabled (block 702). If it is not, then this feature will not be activated. If the VTIOL feature is enabled, the VMM will create some number of kernel threads (i.e., the VTIOLR threads 602) at boot time to handle the re-prioritization (block 703).

The number of VTIOLR threads 602 to create will be determined by the vtiolr_ratio VMO tunable. This tunable indicates the max number of VTIOL threads 502 that will be handled by a single VTIOLR thread 602. The VMM creates the correct amount of VTIOLR threads 602 based on this number and on the number of VTIOL threads 502 defined on the computing system. For example, if there are thirty-two VTIOL threads 502 defined on the computing system and the vtiolr_ratio tunable is set to five, seven VTIOLR threads 602 will be generated. The first six VTIOLR threads 602 will handle the first thirty VTIOL threads 502 and the last VTIOLR thread 602 will handle the last two VTIOL threads 502.

The VTIOL infrastructure 501 employs heuristics to determine whether to offload I/O processing for a page based on a number of different criteria. The VTIOLR infrastructure 601 will have certain similar criteria to help it decide when to re-prioritize the I/O processing. For example, the VMO tunable vtiolr_thrsh denotes the threshold where a VMM I/O request can be re-prioritized by the VTIOLR threads 602. Any buffer element whose age is greater than or equal to this threshold would be eligible for re-prioritization. The VMO tunables vtiolr_pgin_mode and vtiolr_pgout_mode control the re-prioritization mode. These tunables have three valid values: off will not re-prioritize any of these I/O requests, on re-prioritizes all requests, and on where a request is only eligible for re-prioritization if doing so will not result in added lock contention. The VMO tunables vtiolr_rd_size and vtiolr_wr_size control the maximum size of a request that can be re-prioritized. Any requests that are less than or equal to this maximum are eligible to be re-prioritized.

The VMO tunable vtiolr_scan controls how often the main VTIOL queues 503 are scanned for eligible I/O requests. The first criteria to be checked would be the age of the request. If the oldest request in the VTIOLR domain meets the age criteria, the VTIOLR thread 602 is posted. Otherwise, the VTIOLR thread 602 will continue to sleep until the next time the VTIOL queues 503 are scanned. It is important to note that only VTIOLR threads 602 that have an eligible request will be posted and those that do not will continue to sleep. The initial scan is done by a timer request block (trb) 604 (see FIG. 6).

Figure 8:
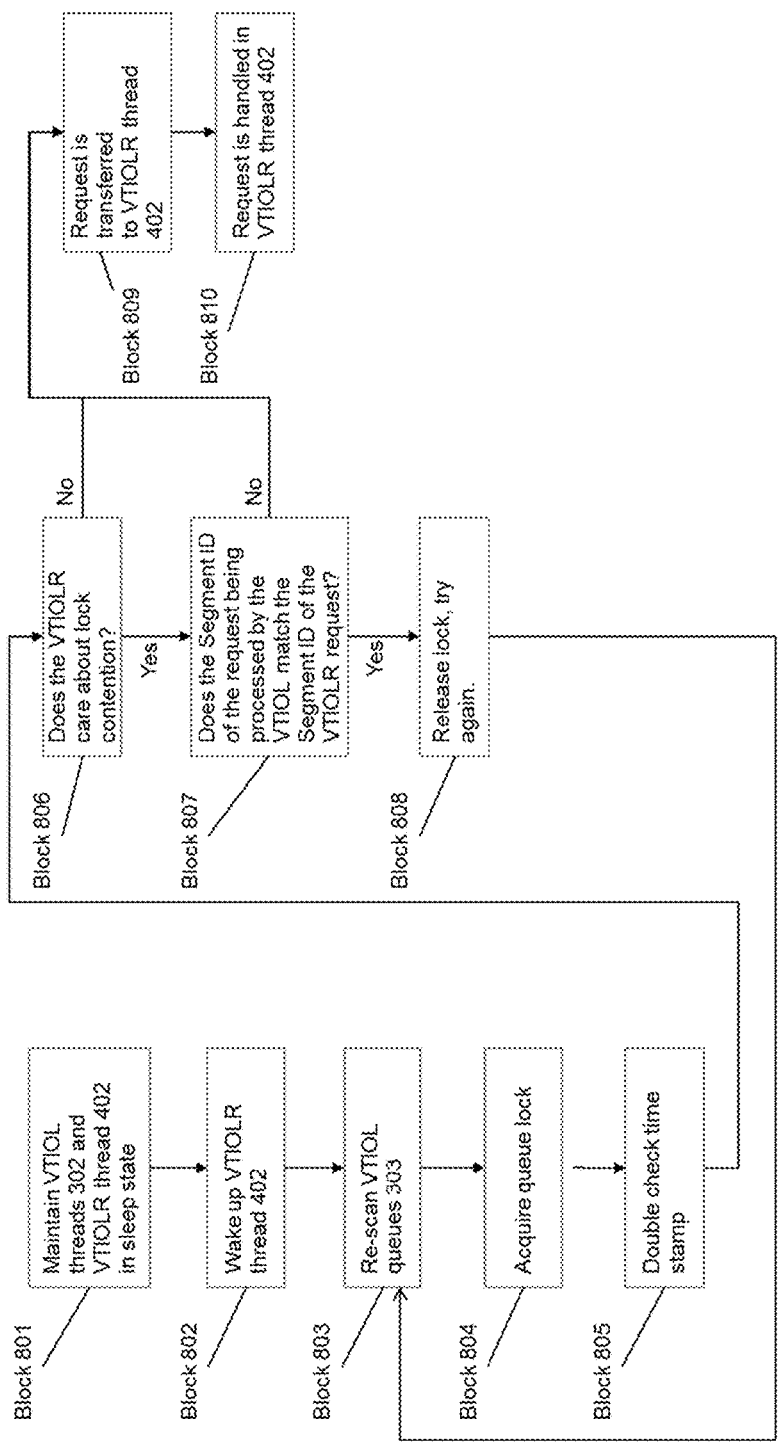
FIG. 8 is a flow diagram illustrating processes executed during operations of a VTIOLR infrastructure in accordance with embodiments.

With reference to FIG. 8, VTIOL and VTIOLR operations will now be described. At an initial time following boot up or system initialization, the VTIOL threads 502 and the VTIOLR thread 602 within a given VTIOLR domain are maintained in a sleep state (block 801). Once a VTIOLR thread 602 has been woken up due to an eligible request in its domain being found (block 802), the VTIOL queues 503 will be scanned again by the VTIOLR thread 602 (block 803). This is done because it is possible for states to change between the time when the thread was posted by the trb 604 and the current time. The scan is done without locking the VTIOL queues 503 so as to keep lock contention to a minimum. All the VTIOL queues 503 in the VTIOLR domain are scanned. Once a suitable I/O request is found, the queue index and VTIOL thread index are used to acquire the queue lock (block 804). The index of the next qualifying request is returned as well to give the VTIOLR thread 602 a second target if the first request does not qualify. This avoids having to fully re-scan the VTIOL queues 503.

Under the queue lock, a time stamp is double checked to ensure that the request that was expected is the one that is currently held (block 805). If the page-in/page-out mode cares about lock contention (block 806), it is checked under the lock as well. If the segment ID of the request currently being processed by the VTIOL thread 602 matches the segment ID of the request (block 807), then the queue lock is released and the request stays in the VTIOL queue 503 (block 808). Otherwise, the request in transferred to the VTIOLR thread 602 (block 809).

Since it is possible for VTIOLR to re-prioritize a request that will lead to lock contention with the VTIOL thread 602, VTIOLR will only re-prioritize requests that are relatively small and will be done one at a time. Thus, this type of lock contention should just be a blip on the radar to VTIOL. The segment ID is only checked against the VTIOL thread 602. Checking the segment ID against VTIOL would not exacerbate any existing lock contention issues, it would move the lock contention from the VTIOL to the VTIOLR instead.

A second queue index may be returned to allow the VTIOLR thread 602 a second chance at processing an I/O request without having to re-scan the VTIOL queues 503 if the first request is locked. If both the first and second requests are locked, the VTIOL queues 503 will be re-scanned using the time base of the first request as an upper bound to avoid returning it as a viable candidate again. An alternate design to this would be to set the hints to skip any requests that come from the same segment ID as the one being worked on by the VTIOL thread.

After all the checks pass, the request is de-queued (see block 809 in FIG. 8) and the hints that point to the oldest requests are updated. When updating the hints, time and size criteria will be checked to point to a buffer that is as close to the best chance for re-prioritization as possible.

When the request is de-queued, the lock is released, and the VTIOLR thread 602 handles the I/O processing (block 810). If a qualifying second request was found, then that means that there is still work to be done. This will let the thread know it must re-scan the VTIOL queues 503 for the next request to re-prioritize. Otherwise, the VTIOLR thread 602 is sent to sleep until it is woken by the trb 604.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A virtual memory manager (VMM) input/output (I/O) completion processing method, comprising:
   identifying a portion of I/O operations that have been offloaded to first kernel threads from a completion handler for re-prioritization;
   re-prioritizing and completing the portion of the I/O operations in a second kernel thread operably associated with the first kernel threads;
   maintaining the second kernel thread in a sleep state;
   scanning the first kernel threads to locate candidates for the portion of the I/O operations; and
   waking the second kernel thread based on a result of the scanning locating the candidates for the portion of the I/O operations.

2. The method according to claim 1, further comprising initializing and configuring the first kernel threads and the second kernel thread at system initialization.

3. The method according to claim 1, wherein the initializing and configuring comprises receiving inputs relative to tunable characteristics and configuring the first kernel threads and the second kernel thread in accordance with the received inputs.

4. The method according to claim 1, wherein the initializing and configuring comprises initializing and configuration plural second kernel threads at the system initialization, each of the plural second kernel threads being operably associated with first kernel threads.

5. A virtual memory manager (VMM) input/output (I/O) completion processing method, comprising
   identifying a portion of I/O operations that have been offloaded to first kernel threads from a completion handler for re-prioritization;
   re-prioritizing and completing the portion of the I/O operations in a second kernel thread operably associated with the first kernel threads
   repeated scanning of the first kernel threads following completion of the portion of the I/O operations; and
   returning the second kernel thread to sleep in an event that no candidates for the portion of the I/O operations are located during the repeated scanning.

6. The method according to claim 5, further comprising initializing and configuring the first kernel threads and the second kernel thread at system initialization.

7. The method according to claim 5, wherein the initializing and configuring comprises receiving inputs relative to tunable characteristics and configuring the first kernel threads and the second kernel thread in accordance with the received inputs.

8. The method according to claim 5, wherein the initializing and configuring comprises initializing and configuration plural second kernel threads at the system initialization, each of the plural second kernel threads being operably associated with first kernel threads.

* * * * *